United States Patent
Teter et al.

(10) Patent No.: US 7,666,929 B2
(45) Date of Patent: Feb. 23, 2010

(54) PROCESS FOR REDUCING FLUOROSURFACTANT CONTENT OF FLUROPOLYMER DISPERSIONS USING ANIONIC SURFACTANT-TREATED ANION EXCHANGE RESIN

(75) Inventors: Kenneth Scott Teter, Washington, WV (US); David William Johnson, Washington, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 269 days.

(21) Appl. No.: 11/805,499

(22) Filed: May 22, 2007

(65) Prior Publication Data

US 2007/0282055 A1 Dec. 6, 2007

Related U.S. Application Data

(60) Provisional application No. 60/809,641, filed on May 31, 2006.

(51) Int. Cl.
 *C08L 1/00* (2006.01)
(52) U.S. Cl. ............ 523/310; 210/662; 524/544; 524/700; 524/800; 524/805; 554/191
(58) Field of Classification Search .......... 523/310; 210/662; 524/544, 700, 800, 805; 554/191
 See application file for complete search history.

(56) References Cited

U.S. PATENT DOCUMENTS

| 2,559,752 | A | | 7/1951 | Berry |
| 3,037,953 | A | | 6/1962 | Marks et al. |
| 3,704,272 | A | | 11/1972 | Holmes |
| 3,882,153 | A | | 5/1975 | Seki et al. |
| 4,282,162 | A | | 8/1981 | Kuhls |
| 5,272,186 | A | | 12/1993 | Jones |
| 6,153,688 | A | | 11/2000 | Miura et al. |
| 6,720,437 | B2 | * | 4/2004 | Jones et al. ............... 554/191 |
| 6,833,403 | B1 | * | 12/2004 | Bladel et al. .............. 524/458 |
| 6,861,466 | B2 | * | 3/2005 | Dadalas et al. ............ 524/544 |
| 2003/0130393 | A1 | | 7/2003 | Cavanaugh et al. |
| 2007/0021551 | A1 | | 1/2007 | Malvasi et al. |

FOREIGN PATENT DOCUMENTS

| EP | 1 533 325 A1 | 5/2005 |
| EP | 1 676 867 A1 | 7/2006 |
| EP | 1676867 A1 * | 7/2006 |

* cited by examiner

*Primary Examiner*—Peter D. Mulcahy
*Assistant Examiner*—Henry Hu

(57) ABSTRACT

A process for reducing fluorosurfactant content of a stabilized fluorosurfactant-containing aqueous fluoropolymer dispersion. The process includes providing a fixed bed of anion exchange resin having anion exchange groups with counter ions. The anion exchange resin is treated to replace at least some the counter ions with counter ions of non-fluorinated anionic surfactant. The stabilized fluorosurfactant-containing aqueous fluoropolymer dispersion is passed through the treated fixed bed of anion exchange resin.

18 Claims, No Drawings

PROCESS FOR REDUCING FLUOROSURFACTANT CONTENT OF FLUROPOLYMER DISPERSIONS USING ANIONIC SURFACTANT-TREATED ANION EXCHANGE RESIN

FIELD OF INVENTION

The present invent relates to reducing the fluorosurfactant content of stabilized aqueous fluoropolymer dispersions and more particularly relates to a process for reducing the fluorosurfactant content of aqueous fluoropolymer dispersions using anion exchange resin which has been treated with non-fluorinated anionic surfactant.

BACKGROUND OF THE INVENTION

Fluoropolymers are applied to a wide number of substrates in order to confer release, chemical and heat resistance, corrosion protection, cleanability, low flammability, and weatherability. Coatings of polytetrafluoroethylene (PTFE) homopolymers and modified PTFE provide the highest heat stability among the fluoropolymers, but unlike tetrafluoroethylene (TFE) copolymers, cannot be melt processed to form films and coatings. Therefore, other processes have been developed for applying coatings of PTFE homopolymers and modified PTFE. One such process is dispersion coating which applies the fluoropolymer in dispersion form. Dispersions used in coating processes are usually in a concentrated form and contain a significant quantity of nonionic surfactant, e.g. 6-8 weight percent, as taught in Marks et al., U.S. Pat. No. 3,037,953, and in Holmes, U.S. Pat. No. 3,704,272 to raise the solids from nominally 35 wt % in the raw dispersion to about 60 wt % in the concentrated dispersion. Miura et al., U.S. Pat. No. 6,153,688 discloses a similar process. Similar dispersions and coating processes are also used for making coatings of melt-processible fluoropolymers.

Fluorosurfactants are typically used as an ingredient in the dispersion polymerization of fluoropolymers since a non-telogenic dispersing agent is generally required in commercial fluoropolymer dispersion polymerization processes. For example, an early description of fluorosurfactants used commercially is found in U.S. Pat. No. 2,559,752 to Berry. These fluorosurfactants are anionic surfactants, usually perfluorinated carboxylic acids, e.g., ammonium perfluorocaprylate or ammonium perfluorooctanoate.

Because of environmental concerns and because anionic fluorosurfactants are expensive, processes have been developed for the removal of anionic fluorosurfactants from aqueous fluoropolymer dispersions. One common method is to remove fluorosurfactant by adsorption onto an anion exchange resin as taught in U.S. Pat. No. 3,882,153 (Seki et al) and U.S. Pat. No. 4,282,162 (Kuhls) and U.S. Pat. No. 6,833,403 (Bladel et al.). For effective removal, such dispersions are stabilized with a non-ionic surfactant, such as alkyl phenol ethoxylates or aliphatic alcohol ethoxylates as disclosed in U.S. Pat. No. 3,037,953 to Marks et al., U.S. Pat. No. 6,153,688 to Miura et al., and U.S. 2003/0130393 to Cavanaugh et al. Dispersions stabilized with nonionic surfactant are used since removal of the fluorosurfactant without nonionic surfactant being present generally results in coagulation of the dispersion.

Although anion exchange processes for fluorosurfactant reduction can be carried out using a slurry method where the anion exchange resin is contacted with the dispersion in a stirred vessel followed by filtering to remove the anion exchange resin, fixed bed processes are often desirable for commercial operation. In a fixed bed process, the anion exchange resin is held in a container, typically cylindrical in shape and referred to as a column, and the dispersion is passed though the column either by gravity feed or by pumping. When pumped, flow can be upward or downward through the bed.

However, in fixed bed anion exchange processes with some dispersions, especially those with high solids levels, e.g., over 45 wt %, and/or dispersions with high molecular weight fluoropolymer, a significant dispersion viscosity increase can occur in the column as the fluorosurfactant content is reduced. A dispersion viscosity increase will correspondingly increase the pressure drop across the column. In gravity feed columns, if the pressure drop exceeds head pressure, dispersion flow will stop. In columns with a pumped dispersion feed, flow can be forced through the column but another type of failure often referred to as "fingering" may result. With fingering, a high viscosity dispersion matrix forms blocked regions and flow occurs only in fingers between these regions. With only a portion of the bed being utilized, premature PFOA breakthrough (i.e. dispersion with high fluorosurfactant levels) can occur. When fingering occurs, the ion exchange bed typically must be replaced.

BRIEF SUMMARY OF THE INVENTION

The present invention provides a process for reducing fluorosurfactant content of a stabilized fluorosurfactant-containing aqueous fluoropolymer dispersion. The process includes providing a fixed bed of anion exchange resin having anion exchange groups with counter ions. The anion exchange resin is treated to replace at least some the counter ions with counter ions of non-fluorinated anionic surfactant. The stabilized fluorosurfactant-containing aqueous fluoropolymer dispersion is passed through the treated fixed bed of anion exchange resin.

Surprisingly, when the anion exchange bed has counter ions of non-fluorinated anionic surfactant, dispersions prone to high pressure drops across the bed are processible with lower pressure drop and/or and fewer high viscosity related processing problems such as fingering.

DETAILED DESCRIPTION OF THE INVENTION

Fluoropolymers

The aqueous fluoropolymer dispersion used in accordance with the present invention is made by dispersion polymerization (also known as emulsion polymerization). Fluoropolymer dispersions are comprised of particles of polymers made from monomers wherein at least one of the monomers contains fluorine. The fluoropolymer of the particles of the aqueous dispersions of this invention is independently selected from the group of polymers and copolymers of trifluoroethylene, hexafluoropropylene, monochlorotrifluoroethylene, dichlorodifluoroethylene, tetrafluoroethylene, perfluoroalkyl ethylene monomers, perfluoro(alkyl vinyl ether) monomers, vinylidene fluoride, and vinyl fluoride.

Preferred fluoropolymer particles used in the dispersion employed in this invention are non-melt-processible particles of polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 wt %, more preferably less than 0.5 wt %. A minimum amount of at least about 0.05 wt % is preferably used to have significant effect. The modified PTFE preferably contains a comonomer modifier which improves film forming capability during baking (fusing), such as perfluoroolefin, notably hexafluoropropylene (HFP) or perfluoro(alkyl vinyl) ether (PAVE), where the alkyl group contains 1 to 5 carbon atoms, with perfluoro (ethyl vinyl) ether (PEVE) and perfluoro(propyl vinyl) ether (PPVE) being preferred. Chlorotrifluoroethylene (CTFE), perfluorobutyl ethylene (PFBE), or other monomer that introduces bulky side groups into the molecule are also included. In this preferred form of the invention, the PTFE typically has a melt creep viscosity of at least $1 \times 10^9$ Pa·s. The resins in the dispersion used in this form of the invention when isolated and dried are thus non-melt-processible.

By non-melt-processible, it is meant that no melt flow is detected when tested by the standard melt viscosity determining procedure for melt-processible polymers. This test is according to ASTM D-1238-00 modified as follows: The cylinder, orifice and piston tip are made of corrosion resistant alloy, Haynes Stellite 19, made by Haynes Stellite Co. The 5.0 g sample is charged to the 9.53 mm (0.375 inch) inside diameter cylinder which is maintained at 372° C. Five minutes after the sample is charged to the cylinder, it is extruded through a 2.10 mm (0.0825 inch diameter), 8.00 mm (0.315 inch) long square-edge orifice under a load (piston plus weight) of 5000 grams. This corresponds to a shear stress of 44.8 KPa (6.5 pounds per square inch). No melt extrudate is observed.

In one preferred embodiment, the fluoropolymer particles in the dispersion used in this invention comprise a core of high molecular weight polytetrafluoroethylene (PTFE) and a shell of lower molecular weight polytetrafluoroethylene or modified polytetrafluoroethylene.

The preferred non-melt-processible PTFE or modified PTFE have a standard specific gravity (SSG) of about 2.13 to about 2.50. Preferably, the SSG is less than about 2.40, more preferably less than about 2.30, and most preferably less than about 2.25. The SSG is generally inversely proportional to the molecular weight of PTFE or modified PTFE.

The fluoropolymer particles in the dispersion used in this invention preferably have a number average particle size of about 10 nm to about 400 nm, most preferably, about 100 nm to about 400 nm.

A typical process for the aqueous dispersion polymerization of preferred PTFE polymer is a process wherein TFE vapor is fed to a heated reactor containing fluorosurfactants, paraffin wax and deionized water. A chain transfer agent may also be added if it is desired to reduce the molecular weight of the PTFE. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and the dispersion is isolated and stabilized with nonionic surfactant.

The fluorosurfactant used in the manufacture of the dispersion is a non-telogenic, fluorinated anionic surfactant, soluble in water and comprising an anionic hydrophilic group and a hydrophobic portion. Preferably, the hydrophobic portion is an aliphatic fluoroalkyl group containing at least four carbon atoms and bearing fluorine atoms and having no more than two carbon atoms not bearing fluorine atoms adjacent to the hydrophilic group. These fluorosurfactants are used as a polymerization aid for dispersing and, because they do not chain transfer, they do not cause formation of polymer with undesirable short chain length. An extensive list of suitable fluorosurfactants is disclosed in U.S. Pat. No. 2,559,752 to Berry. Preferably, the fluorosurfactant is a perfluorinated carboxylic or sulfonic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed. The fluorinated surfactant is used to aid the polymerization process but the amount remaining in the dispersion is significantly reduced as will be explained below.

The initiators preferably used to make dispersion of this invention are free radical initiators. They may be those having a relatively long half-life, preferably persulfates, e.g., ammonium persulfate or potassium persulfate. To shorten the half-life of persulfate initiators, reducing agents such as ammonium bisulfite or sodium metabisulfite, with or without metal catalysis salts such as Fe (III), can be used. Alternatively, short half-life initiators such as potassium permanganate/oxalic acid can be used.

In addition to the long half-life persulfate initiators, small amounts of short chain dicarboxylic acids such as succinic acid or initiators that produce succinic acid such as disuccinic acid peroxide (DSP) may be also be added in order to reduce coagulum To produce dispersion with low fluorosurfactant content as described below, sufficient stabilizer as is described in more detail hereinafter is added to prevent coagulation of the dispersion when the fluorosurfactant content is reduced. The aqueous dispersion can range in fluoropolymer solids content from about 15 to about 65 wt %, preferably about 25 to about 55 wt %, more preferably 35 to about 50 wt %.

Nonionic Surfactant Stabilizers

Any of a variety of nonionic surfactants can be used for dispersion stabilization in the process for reducing fluorosurfactant content of aqueous fluoropolymer dispersion in accordance with the invention. Such nonionic surfactants include alkyl phenol ethoxylates and aliphatic alcohol ethoxylates. Preferably, the nonionic surfactants used are aliphatic alcohol ethoxylates. The nonionic surfactants are preferably present in the dispersion in amounts of about 2 to about 11 weight %, most preferably about 3 to about 11 weight %, based on the weight of the fluoropolymer. Further, the nonionic surfactant is preferably present in the amount of about 1 to about 5% based on the weight of the dispersion. Suitable nonionic surfactants include any of a variety of nonionic surfactants or mixtures thereof which preferably provide a desired cloud point during concentration.

The dispersions used in this invention are preferably essentially free of surfactants containing aromatic groups that can thermally decompose and be converted to harmful organic aromatic compounds that may adversely affect air and water quality during dispersion coating processes. In addition, these materials are prone to producing tar-like buildup on processing equipment and producing smoke. Essentially free of essentially free of surfactants containing aromatic groups preferably means that the dispersions employed contain less than about 0.5 weight % of such surfactants. The surfactants used in this invention burn off cleanly without thermally decomposing on a substrate leaving lower residuals than alkyl phenol ethoxylates.

Especially preferred aliphatic alcohol ethoxylates are a compound or mixture of compounds of the formula:

R(OCH$_2$CH$_2$)$_n$OH wherein R is a branched alkyl, branched alkenyl, cycloalkyl, or cycloalkenyl hydrocarbon group having 8-18 carbon atoms and n is an average value of 5 to 18. For example, a preferred ethoxylate used in this invention can be considered to be prepared from (1) a primary alcohol that is comprised of a hydrocarbon group selected from branched alkyl, branched alkenyl, cycloalkyl or cycloalkenyl or (2) a secondary or tertiary alcohol. In any event, the ethoxylate used in accordance with this invention does not contain an aromatic group. The number of ethylene oxide units in the hydrophilic portion of the molecule may comprise either a broad or narrow monomodal distribution as typically supplied or a broader or bimodal distribution which may be obtained by blending.

Nonionic surfactants employed in dispersions employed in accordance with the invention are preferably ethoxylates of saturated or unsaturated secondary alcohols having 8-18 carbon atoms. Secondary alcohol ethoxylates possess advantages over both primary alcohol ethoxylates and phenol ethoxylates including lower aqueous viscosities, more narrow gel ranges, and less foaming. Moreover, ethoxylates of secondary alcohols provide improved surface tension lowering and thus excellent wetting in end use applications such as coating operations.

The cloud point of a surfactant is a measure of the solubility of the surfactant in water. The surfactants in the aqueous dispersion employed in accordance with the invention preferably have a cloud point of about 30° C. to about 90° C., preferably about 35° C. to about 85° C.

The aliphatic alcohol ethoxylates employed in carrying out the present invention also have a 20% residuals temperature determined by TGA of less than about 290° C., preferably less than 285° C. more preferably less than 280° C. and typically fall within the preferred range of 250° C. to 290° C. In addition or in the alternative, it is preferred that the aliphatic alcohol ethoxylate nonionic surfactant has a thermal decomposition temperature determined by thermogravimetric analysis (TGA) of less than about 250° C., more preferably less than about 240° C., most preferably less than about 230° C.

Nonionic surfactants of the type generally used to stabilize fluoropolymer dispersions can be either liquids or solids at room temperature. If solid, the surfactant tends to be pasty and difficult to handle. They can be handled but often require heated tanks and transfer lines to keep them as a liquid. In addition to the capital cost of the heated equipment, there are operational restrictions placed on the system. If the temperature is maintained too low, tanks and transfer lines can become plugged with solid material. If the temperature is too high, degradation of the surfactant can occur.

Generally low viscosity liquids are preferred from a handling point of view. High viscosity liquids are more difficult to handle and often require heated tanks and lines to keep the viscosity low enough for ease in handling. Some of the apparent liquid surfactants are physically metastable in that they may exist as liquids for several days and then turn into pasty solids. Sometimes water is added to the surfactant to lower its viscosity and making it easier to handle. However, too much water detracts from the desire to produce more concentrated dispersions.

The aqueous dispersion of non-melt-processible fluoropolymer particles and nonionic surfactant preferably used in this invention preferably contains a nonionic surfactant containing 0-20 weight % water, preferably 0-15 weight % water and is a stable liquid at room temperature. A surfactant is considered to be a stable liquid if it remains liquid for 3 days at room temperature after being chilled to 5° C. and then warmed to room temperature (about 23±30° C.).

In a more preferred form of the dispersion employed in accordance with the invention, the aliphatic alcohol ethoxylate nonionic surfactant comprises ethoxylates of 2,6,8-trimethyl-4-nananol having an average of about 4 to about 12 ethylene oxide (EO) units, most preferably, ethoxylates of 2,6,8-trimethyl-4-nananol having an average about 9 to about 11 ethylene oxide units. Examples of preferred surfactants of this type are those sold under the trademark Tergitol® TMN-6 (nominally 6 EO units) and Tergitol® TMN-10 (nominally 10 EO units) which are available from Dow Chemical Corporation. A blend of 30% Tergitol® TMN-6 and 70% Tergitol® is also available from Dow Chemical Corporation as Tergitol® TMN-100X.

Dispersing Agents

Anionic polyelectrolyte dispersing agents can also be employed in dispersions in accordance with the invention for stabilization. These dispersing agents are different from surfactants because they are polymeric and do not contain distinct hydrophilic and hydrophobic portions. The anionic polyelectrolyte dispersing agents contain anionic groups and it is believed that stabilization of fluoropolymer dispersions occurs when the anionic polyelectrolyte dispersing agents coat the fluoropolymer particles. The anionic groups carried on the anionic polyelectrolyte dispersing agents increase the surface charge on the particle and confer stability by repulsion of the electrical charges between particles. Unlike surfactants, these dispersing agents typically have little if any significant effect on surface tension of the dispersion. The surface tension of the dispersion containing anionic polyelectrolyte dispersing agents remains high, preferably greater than about 40 mS/cm, unless surfactants are added to alter wetting properties, for viscosity control, improve stability etc.

The anionic polyelectrolyte dispersing agents preferably are anionic polymers, having a linear or branched structure, with anionic groups distributed along the polymeric chain, optionally present also in the chain end groups. The polyelectrolytes preferably have an equivalent weight, defined as molecular weight/number of anionic groups present in the polyelectrolyte, greater than about 150, preferably greater than about 200, still more preferably greater than about 250. Generally the equivalent weight of the anionic polyelectrolyte dispersing agents usable in the process of the present invention is less than about 50,000, preferably less than about 10,000, more preferably less than about 3,000, still more preferably less than about 1,500.

The number average molecular weight of the anionic polyelectrolyte dispersing agent is preferably at least about 500, more preferably in the range of about 500 to about 100,000. More preferably, the molecular weight is at least about 1,000. Especially preferred embodiments have a molecular weight of about 2,000 to about 100,000 and preferably 5,000 to about 20,000.

The anionic polyelectrolyte dispersing agents preferably contain in the molecule a number of anionic functional groups higher than or equal to 2, more preferably greater than or equal to 5. The anionic groups present in the molecule of the anionic polyelectrolyte agents are preferably selected from carboxylates, sulphates, sulphonates, phosphates, phosphonates, are more preferably carboxylates, sulphates, sulphonates, and still more preferably are carboxylates. Generally, the anionic polyelectrolyte dispersing agents do not contain fluorine atoms.

Preferably, the anionic polyelectrolyte dispersing agents used according to the present invention are selected from anionic homopolymers or copolymers of monomers selected from acrylic or vinyl monomers which preferably provide the number of anionic groups and equivalent weight as described above.

Preferred anionic polyelectrolyte dispersing agents are described as being hydrophobic acrylic copolymers. Examples of polymer of this type are sold under the trademarks TAMOL® 681, TAMOL® 2001, TAMOL® 165A and TAMOL® 731A sold by Rohm and Haas. Such dispersing agents are known for use in acrylic-based paints to prevent agglomeration of pigments but they are not known for use in fluoropolymer dispersions. A preferred acrylic copolymer dispersing agent for use in this invention comprises methacrylic acid/butyl methacrylate copolymer. More preferably the methacrylic acid/butyl methacrylate copolymer comprises about 30 to about 50 mol % methacrylic acid units and about 50 to about 70 mol % butyl methacrylate units.

A preferred acrylic copolymer dispersing agent for use in this invention has a molecular weight of about 2,000 to about 100,000 and more preferably has a molecular weight of about 5,000 to about 20,000.

The dispersions employed in accordance with this form the invention preferably contain an amount from about 0.03 wt % to about 10 wt % of the anionic polyelectrolyte dispersing agent, more preferably from about 0.1 to about 10 wt %, and most preferably 0.5 wt % to about 5.5 wt % based on the weight of fluoropolymer solids. All percentages of the anionic polyelectrolyte dispersing agent are based on active ingredients.

Although the preferred acrylic copolymer dispersing agent may be supplied in acid form, it is employed in salt form in the fluoropolymer dispersions of the invention for effective stabilization. Although various salt forms can be used, a preferred form of the acrylic copolymer dispersing agent is in the form of an ammonium salt so that it does not introduce extraneous cations into the dispersion. For the acrylic copolymer dispersing agent to be predominantly in salt form and soluble in water, the pH of the fluoropolymer dispersion is preferably at least about 9, more preferably at least about 9.5.

Other Stabilizers

Dispersions containing other surfactants and dispersing agents as stabilizers for the dispersion, besides the stabilizers specifically disclosed in this application, may also be subject to the same or similar pressure drop and/or fingering problems in a fixed bed anion exchange process for fluorosurfactant removal. Choosing an anionic surfactant which is compatible with the particular dispersion, the invention is advantageously employed similarly with such dispersions.

Anion Exchange

The process of the invention employs a fixed bed of anion exchange resin. Fixed bed procedures as known in the art can be generally employed as taught has been taught in U.S. Pat. No. 3,882,153 (Seki et al.), U.S. Pat. No. 4,282,162 (Kuhls), and U.S. Pat. No. 6,833,403 (Bladel et al.).

Passing the stabilized dispersion through a fixed bed of the ion exchange resin with the dispersion can occur before or after concentration but typically the lower solids material before concentration is easier to process. If the process is carried out prior to concentration, stabilizers as discussed above are added prior to contact with the ion exchange resin. Concentrated dispersions containing stabilizer as described above are also suitable for use in the practice of the present invention.

Known apparatus such as an ion exchange column can be used to pass the dispersion through the ion exchange resin to carrying out anion exchange in accordance with the process of the invention. Gravity feed processes can be employed if desired. If the dispersion is pumped through the bed, flow can be upward or downward through the bed. The contacting of the dispersion is preferably performed at a temperature which is sufficiently high to facilitate the rate of ion exchange and to reduce the viscosity of the dispersion but being below a temperature at which the resin degrades at a detrimentally high rate or a viscosity increase in observed. Upper treatment temperature will vary with the type of polymer and nonionic surfactant employed. Typically, temperatures will be between 20° C. and 80° C.

The fluorosurfactant can be recovered from the ion exchange resin if desired or the resin with the fluorosurfactant can be disposed of in an environmentally acceptable method, e.g., by incineration. If it is desired to recover the fluorosurfactant, the fluorosurfactant may be removed from the resin by elution. Elution of fluorosurfactant adsorbed on the anion exchange resin is readily achieved by use of ammonia solution as demonstrated by Seki et al in U.S. Pat. No. 3,882,153; by a mixture of dilute mineral acid with organic solvent (e.g., HCl/ethanol) as demonstrated by Kuhls in U.S. Pat. No. 4,282,162; or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, or other methods of concentration, etc.

In preferred embodiments of the process of this invention, the fluorosurfactant is reduced to a predetermined level is less than about 300 ppm based on the total dispersion weight, more preferably less than about 100 ppm, even more preferably less than about 50 ppm, even more preferably less that about 20 ppm, and most preferably less that about 10 ppm, based on the weight of the dispersion.

Ion Exchange Resins

The ion exchange resins for use in accordance with reducing the fluorosurfactant content of the aqueous dispersion of the present invention include anionic resins but can also include other resin types such as cationic resins, e.g., in a mixed bed. The anionic resins employed can be either strongly basic or weakly basic. Suitable weakly basic anion exchange resins contain primary, secondary amine, or tertiary amine groups. Suitable strongly basic anion exchange resin contain quaternary ammonium groups. Although weakly basic resins are useful because they can be regenerated more easily, strongly basis resins are preferred for use in the practice of the present invention. Strongly basic ion exchange resins also have the advantage of less sensitivity to the pH of the media. Strong base anion exchange resins have an associated counter ion and are typically available in chloride or hydroxide form but are readily converted to other forms if desired. Anion exchange resins with hydroxide, chloride, sulfate, and nitrate can be used for the removal of the fluorosurfactant but anion exchange resins in the form of hydroxide are preferred to prevent the introduction of additional anions and to increase pH during anion exchange because a high pH, i.e., greater than 9, is desirable in the product prior to shipping to inhibit bacterial growth. Examples of suitable commercially-available strong base anion exchange resins with quaternary ammonium groups with a trimethylamine moiety include DOWEX® 550A, US Filter A464-OH, SYBRON M-500-OH, SYBRON ASB1-OH, PUROLITE A-500-OH, Itochu TSA 1200, AMBERLITE® IR 402. Examples of suitable commercially-available strong base anion exchange resins with quaternary ammonium groups with a dimethyl ethanol amine moiety include US Filter A244-OH, AMBERLITE® 410, DOWEX® MARATHON A2, and DOWEX® UPCORE Mono A2.

Ion exchange resin used to reduce fluorosurfactant for use in the process of the present invention is preferably monodisperse. Preferably, the ion exchange resin beads have a number average size distribution in which 95% of the beads have a diameter within plus or minus 100 µm of the number average bead diameter.

The monodisperse ion exchange resin has a particle size which provides a suitable pressure drop through the bed. As discussed previously, very large beads are fragile and prone to breakage. Very small ion exchange beads are susceptible to tight particle packing resulting in tortuous channels in the bed. This can result in high shear conditions in the bed. Preferred ion exchange resin has a number average bead size about 450 to about 800 µm, more preferably, the ion exchange resin beads have a number average bead diameter of about 550 to about 700 µm.

Anion Exchange Resin Treatment

In accordance with the invention, the anion exchange resin is treated to replace at least some of its counter ions with counter ions of non-fluorinated anionic surfactant.

In the practice of the invention, the anion exchange resin is treated by contacting the resin with the anionic surfactant under conditions which cause at least some of the existing counter ions to be replaced by the anionic surfactant, i.e., the anion of anionic surfactant. For example, if the resin is initially in hydroxide form, i.e., has OH⁻ counter ions, treatment with the anionic surfactant sodium lauryl sulfate replaces some of those OH⁻ ions with lauryl sulfate anions as counter ions. Any of variety of non-fluorinated anionic surfactants can be used including but not limited to sodium lauryl sulfate, ammonium lauryl sulfate, sodium dodecylbenzyl sulphonate and secondary alkyl sulphonate sodium salts. Additional anionic surfactants such as those disclosed in U.S. Pat. No. 6,861,466 (Dadelas et al.) can also be used. Preferably, the pKa value of the acid corresponding to the non-fluorinated anionic surfactant is greater than or equal to the pKa of the acid corresponding to fluorosurfactant being removed from the dispersion. An especially preferred non-fluorinated anionic surfactant is ammonium or alkali metal lauryl sulfate, most preferably sodium lauryl sulfate.

Treatment of the anion exchange resin to replace at least some counter ions with non-fluorinated anionic surfactant counter ions can be accomplished by contacting the anion exchange resin with the non-fluorinated anionic surfactant. In one preferred embodiment of the invention, the contacting treatment is performed prior to contacting with the stabilized fluorosurfactant-containing aqueous fluoropolymer dispersion, i.e., the anion exchange resin is pretreated. This can be accomplished by passing a dilute solution, e.g., 0.5 to 10 wt %, of the anionic surfactant through the column. In accordance with another preferred form of the invention, the non-fluorinated anionic surfactant treatment is carried out as the stabilized fluorosurfactant-containing aqueous fluoropolymer dispersion is passed through the column. This is preferably accomplished by adding non-fluorinated anionic surfactant to the dispersion so that it is present in the stabilized fluorosurfactant-containing aqueous fluoropolymer dispersion as it contacts the anion exchange resin. Suitable concentrations in the dispersion are about 20 to about 500 ppm based on the weight of the dispersion.

In a preferred form of the invention, the treatment with anion exchange converts about 0.01 to about 60% of the available anion exchange sites to anionic surfactant counter ions. More preferably, the treatment converts about 0.05 to about 10% of the available anion exchange sites, most preferably about 0.1 to about 5%.

The treatment with non-fluorinated anionic surfactant has been observed to improve column operation. In pumped systems, pressure drop across the column can be reduced by 50% or more. With reduced pressure drop, there is also a reduced incidence of fingering. Columns treated with anionic surfactant in accordance with the invention typically exhibit improved operation throughout the life of the column.

The anionic surfactant treatment is believed to improve column operation by the following mechanism. Certain dispersions, especially those with high solids and/or high molecular weight polymer, display a viscosity increase in the working zone of the fixed bed, i.e., the working zone being area of the bed where most of the anion exchange occurs and which advances through the column as the bed is exhausted. The viscosity increase is believed to be due to the low levels of anionic fluorosurfactant in the dispersion since high viscosities are often observed in concentrated dispersion with low fluorosurfactant levels. This viscosity increase causes the increased pressure drop because of the additional pressure required to pump the dispersion through the column. Since the anionic surfactant preferably has a pKa of greater than or equal to the pKa of the fluorosurfactant, the fluorosurfactant will displace the anionic surfactant counter ions from the anion exchange resins which have been treated with anionic surfactant. The displaced surfactant is thus made available in the working zone and the presence of an anionic surfactant counters the tendency of the dispersion to increase in viscosity on removal of the anionic fluorosurfactant This reduction in viscosity also makes the column less susceptible to "fingering". Fingering is caused by the lower viscosity fluorosurfactant containing dispersion entering the high viscosity dispersion in the working zone. The displacement of high viscosity dispersion with lower viscosity dispersion leads to a non-uniform working zone band. This uneven profile can then lead to the passage of dispersion through a narrow channel of exhausted ion exchange resin, i.e., a "finger", whereas the ion exchange resin surrounding the channel is filled with high viscosity dispersion that is not displaced. It is believed that the reduction of viscosity due to the displaced anionic surfactant also reduces the incidence of fingering.

Concentration

In a preferred form of the invention, the process includes concentration of the dispersion. Concentration can be carried out by any of a variety of known methods. When nonionic surfactants are used for stabilization, concentration is suitably carried out as disclosed in Marks et al., U.S. Pat. No. 3,037,953, Holmes, U.S. Pat. No. 3,704,272 Miura et al., U.S. Pat. No. 6,153,688 which disclose thermal concentration processes. In thermal concentration, the dispersion is heated to a temperature at which the solubility of the nonionic surfactant is lower under the conditions employed, i.e., to the "cloud point". This temperature is primarily dependent upon the type of nonionic surfactant employed but also varies to a lesser extent with factors including the amount of nonionic surfactant, the presence of other materials in the dispersion and solids content. Heating to the cloud point, is used to create a phase separation with a lower high solids concentrated phase and a very low solids upper phase. These phase are separated usually by decanting off the upper phase. When anionic polyelectrolyte dispersing agents such as hydrophobic acrylic copolymer dispersing agents are used for stabilization, concentration can be carried out by the addition of an acrylic polymer of high acid content as described in U.S. Pat. No. 5,272,186 to Jones. Other concentration methods known in the art can be used if desired. Preferably, the concentrated dispersions have a solids content of about 25 to about 70 wt %.

What is claimed is:

1. A process for reducing the fluorosurfactant content of a stabilized fluorosurfactant-containing aqueous fluoropolymer dispersion comprising:
    providing a fixed bed of anion exchange resin having anion exchange groups with counter ions;
    treating said anion exchange resin to replace at least some said counter ions with counter ions of non-fluorinated anionic surfactant; and
    passing said stabilized fluorosurfactant-containing aqueous fluoropolymer dispersion through said fixed bed of anion exchange resin.

2. The process of claim 1 wherein said treating said anion exchange resin to replace at least some said counter ions with non-fluorinated anionic surfactant counter ions comprises contacting said anion exchange resin with said non-fluorinated anionic surfactant prior to contacting with said stabilized fluorosurfactant-containing aqueous fluoropolymer dispersion.

3. The process of claim 1 wherein said treating said anion exchange resin to replace at least some said counter ions with non-fluorinated anionic surfactant counter ions is carried out as said stabilized fluorosurfactant-containing aqueous fluoropolymer dispersion is passed through said fixed bed of anion exchange resin.

4. The process of claim 3 wherein said non-fluorinated anionic surfactant is present in said stabilized fluorosurfactant-containing aqueous fluoropolymer dispersion.

5. The process of claim 1 wherein said pKa value of the acid corresponding to said non-fluorinated anionic surfactant is greater than or equal to the pKa of the acid corresponding to said fluorosurfactant.

6. The process of claim 1 wherein said stabilized fluorosurfactant-containing aqueous fluoropolymer dispersion has a solids content of about 15 to about 60 wt %.

7. The process of claim 1 wherein said stabilized fluorosurfactant-containing aqueous fluoropolymer dispersion has a solids content of about 25 to about 55 wt %.

8. The process of claim 1 wherein said stabilized fluorosurfactant-containing aqueous fluoropolymer dispersion has a solids content of about 35 to about 50 wt %.

9. The process of claim 1 further comprising concentrating said dispersion.

10. The process of claim 9 wherein said concentrating produces a dispersion having a solids content of about 25 to about 70 wt %.

11. The process of claim 1 wherein said stabilized fluorosurfactant-containing aqueous fluoropolymer dispersion comprises nonionic surfactant as a stabilizer.

12. The process of claim 11 wherein said non-ionic surfactant is present in an amount of about 1 to about 5% based the weight of the dispersion.

13. The process of claim 1 wherein said stabilized fluorosurfactant containing aqueous fluoropolymer dispersion comprises anionic polyelectrolyte dispersing agent as a stabilizer.

14. The process of claim 9 wherein said reducing of fluorosurfactant content is performed prior to said concentrating.

15. The process of claim 1 wherein said contacting said stabilized fluorosurfactant-containing aqueous fluoropolymer dispersion with anion exchange resin reduces fluorosurfactant content to less than about 300 ppm.

16. The process of claim 1 wherein said contacting said stabilized fluorosurfactant-containing aqueous fluoropolymer dispersion with anion exchange resin reduces fluorosurfactant content to less than about 100 ppm.

17. The process of claim 1 wherein said contacting said stabilized fluorosurfactant-containing aqueous fluoropolymer dispersion with anion exchange resin reduces fluorosurfactant content to less than about 50 ppm.

18. The process of claim 1 wherein said treating with anionic surfactant converts about 0.01 to about 60% of said anion exchange sites to anionic surfactant counter ions.

* * * * *